United States Patent [19]

Girguis

[11] 4,079,599
[45] Mar. 21, 1978

[54] CONSTANT VELOCITY UNIVERSAL JOINT

[75] Inventor: Sobhy Labib Girguis, Troisdorf-Oberlar, Germany

[73] Assignee: Uni-Cardan AG, Lohmar, Germany

[21] Appl. No.: 703,559

[22] Filed: Jul. 2, 1976

[30] Foreign Application Priority Data

Jul. 3, 1975 Germany ............................ 2529695

[51] Int. Cl.² ............................................. F16D 3/30
[52] U.S. Cl. ............................................. 64/21; 64/8; 64/7
[58] Field of Search .................................. 64/21, 8, 7

[56] References Cited

U.S. PATENT DOCUMENTS

| | | | |
|---|---|---|---|
| 3,789,626 | 2/1974 | Girguis | 64/21 |
| 3,798,927 | 3/1974 | Girguis | 64/21 |
| 3,857,256 | 12/1974 | Girguis | 64/21 |
| 4,008,582 | 2/1977 | Welschof | 64/21 |

*Primary Examiner*—Benjamin W. Wyche
*Assistant Examiner*—R. C. Turner

*Attorney, Agent, or Firm*—Edmund M. Jaskiewicz

[57] ABSTRACT

A constant velocity universal joint has an outer joint member with a bore therethrough and an inner joint member within the bore. A plurality of torque transmitting elements, such as balls, are positioned within opposed substantially axially extending grooves formed in the facing surfaces of the inner and outer joint members. The balls are retained in a ball plane by a cage which has an outer spherical surface guided within a correspondingly shaped cylindrical surface in the bore and an inner concave surface which is guided upon a spherical surface of a control body mounted as a separate component on the inner joint member. The centers of the outer and inner cage spherical surfaces are equidistant on opposite sides of the ball plane. The control body has a plurality of control elements positioned between adjacent balls and a plurality of extensions extend from said control elements toward the outer spherical surface of the cage and project beyond the ball plane. The distance between adjacent extensions is less than the diameter of each ball.

3 Claims, 4 Drawing Figures

CONSTANT VELOCITY UNIVERSAL JOINT

The present invention relates to constant velocity universal joints, more particularly, to such a joint wherein the torque transmitting balls will be retained in their operative positions in the grooves when the inner joint member is removed.

The known construction of a constant velocity universal joint includes an outer joint member having a bore and an inner joint member positioned within the bore. Substantially axially extending grooves are formed in the opposing surfaces of the inner and outer joint members and torque transmitting balls are positioned in opposed grooves. A cage is positioned between the joint members and has openings therein to retain the balls in a plane which is perpendicular to the axis of the cage. The cage has a first spherical surface on its outer face so as to be guided in a correspondingly shaped spherical surface in the bore of the outer joint element. The cage is also provided with a second spherical surface on its inner face which is guided upon a correspondingly shaped spherical surface of a control body which is mounted as a separate component on the inner joint member. The centers of the first and second cage spherical surfaces are equidistant on opposite sides of the ball plane.

In such a constant velocity universal joint as described above it is further known to construct the control body of a plurality of individual control elements which are positioned between the balls on the portions of the inner joint member between the ball grooves therein. The control elements are then interconnected by a ring to form a substantially annular comb shape.

One disadvantage of such a universal joint was that when the joint was disassembled by withdrawing the inner joint member the balls would no longer be supported in their respective grooves and would fall out. It was therefore necessary to re-introduce each ball in its respective groove and opening of the cage upon assembly of the joint. Further, in order to obtain proper and precise clearance with respect to the ball, cage and joint members in order for the joint to function properly it was frequently necessary to precisely sort the torque transmitting balls by diameter and then selectively assemble the balls to the most suitably dimensioned opposed pairs of grooves and cage openings. Here again, after this time-consuming operation, the balls would fall from the cage upon disassembly of the joint when the inner joint member was withdrawn.

It is therefore the principal object of the present invention to provide an improved constant velocity universal joint wherein the torque transmitting balls will be retained in their operative positions in their respective grooves and cage openings so as to facilitate disassembly and reassembly of the joint.

It is another object of the present invention to provide a constant velocity universal joint wherein the outer joint member, cage, control body and torque transmitting balls can be assembled as a unit.

According to one aspect of the present invention, a constant velocity universal joint of the type as described above has a plurality of extensions formed on the control body so as to be positioned between the balls and extend toward the outer spherical surface of the cage and to project beyond the ball plane. The distance between adjacent extensions is less then the diameter of each ball.

With this construction of the control body the balls will be safely retained in the cage openings and in the grooves provided for them upon withdrawal or removal of the inner joint member. In addition, the assembly of the universal joint will be facilitated since the outer joint member, cage, torque transmitting balls and control body can be assembled as a unit and can be stored in inventory as a unit. In addition, this unit will be dimensionally selected only with respect to the angle of deflection and torque to be transmitted while only the inner joint member will be affected by the sliding or axial displacement distance.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views, a specific embodiment of the present invention will be described in detail.

Figure 1:
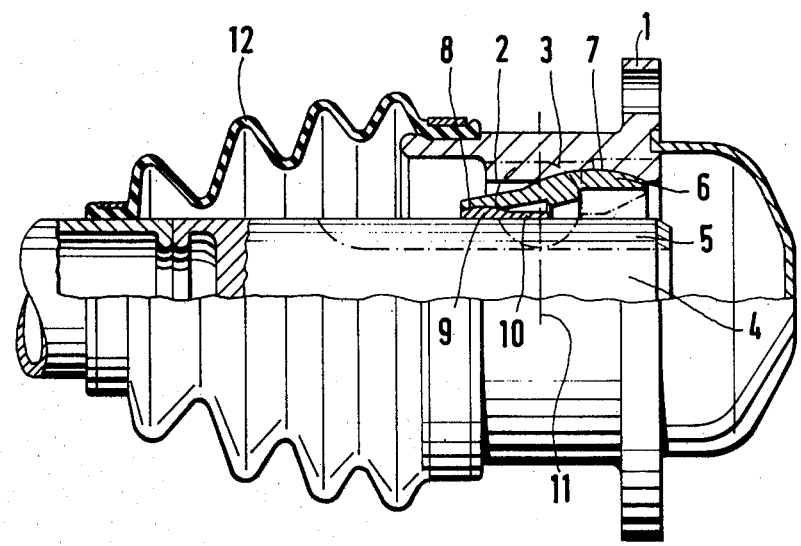
FIG. 1 is an elevational view of a constant velocity universal joint according to the present invention with a portion of the joint being shown in an axial section.

The constant velocity universal joint shown in FIG. 1 comprises an outer joint member 1 having an external flange with openings therein to receive fastening means for connection to a suitable component. The outer joint member 1 has an axially extending bore therethrough the surface of which is provided with a plurality of circumferentially spaced substantially axially extending grooves 2 in which are received torque transmitting balls 3. An inner joint member 4 is positioned within the axial bore and is provided on its outer surface with a corresponding plurality of circumferentially spaced substantially axially extending grooves 5 within which are received the balls 3. The grooves in the outer and inner joint members are positioned so as to form pairs of opposed grooves and a torque transmitting ball is positioned in each pair of opposed grooves. A cage 6 is positioned between the outer and inner joint members and is provided with a plurality of openings corresponding to the member of torque transmitting balls with each ball being positioned in a cage opening. The balls are thus retained in position in the grooves and the ball centers are positioned in a plane 11 which is perpendicular to the longitudinal axis of the cage.

The cage 6 is further provided with an outer convex spherical surface 7 which is guided in a correspondingly shaped concave spherical surface formed in the bore of the outer joint member 1. The inner surface of the cage 6 is provided with a concave spherical surface 8 which receives a correspondingly shaped convex spherical surface on a control body 9 mounted as a separate component on the inner joint member 4. The control body 9 is slidable on the ridges formed between adjacent grooves 5 of the inner joint member. The centers of the cage outer spherical surface 7 and inner spherical surface 8 are located equidistantly on opposite sides of the plane 11 which passes through the center of the torque transmitting balls.

A flexible pleated or corrugated boot 12 is connected between one end of the outer joint member 1 and the inner joint member so as to seal the joint from the exterior. A removable cap or cover is provided on the other end of the outer joint member to seal the interior of the joint.

Figure 2:
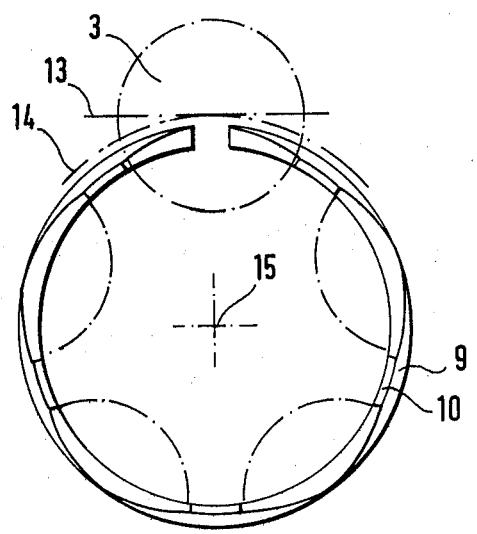
FIG. 2 is an end or axial view of a control body according to the present invention and showing the torque transmitting ball operatively positioned therein.
Figure 4:
Figure 3:
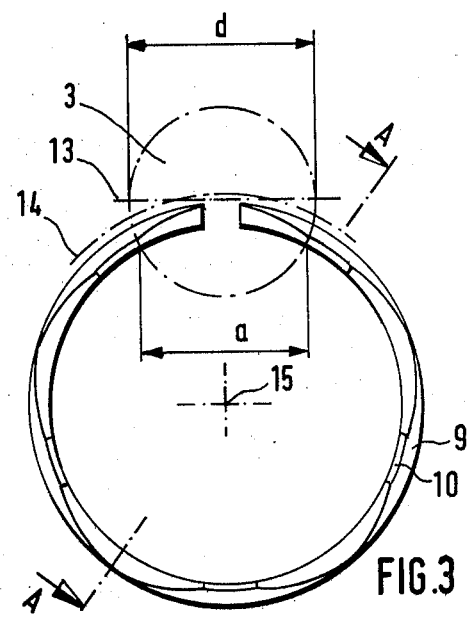
FIG. 3 is a view similar to that of FIG. 2 and showing the position of a torque transmitting ball after the inner joint member has been removed from the joint; and, FIG. 4 is a sectional view taken along the line A—A of FIG. 3.

The control body 9 comprises a plurality of control elements each of which is positioned upon the ridge portion formed in the inner joint member between adjacent balls. The control elements are inter-connected by an annular web or ring to form what may be described as an annular comb. The control body 9 may be provided with an axial split as shown in FIGS. 2 and 3 to facilitate assembly. As can be seen in FIGS. 1 and 4, the control body 9 is provided with a plurality of substantially axial extensions 10 each of which extends from a control element along a ridge in the inner joint member formed between adjacent grooves 5. The extensions 10 extend beyond the ball plane 11 as can be seen in FIG. 1 toward the outer convex spherical surface 7 of the cage. The distance between adjacent extensions 10 is less than the diameter of a ball 3 positioned between the extensions such that a torque transmitting ball 3 is positioned within the control body as shown in FIG. 2. The ball 3 is shown in its operating or functioning position wherein the center 13 of the ball 3 is located on a circle 14 upon which the centers of the balls rotate. In this operating position there is a certain clearance between the ball 3 and the extensions 10 on the control body 9 which ensures free rolling movement of the balls during operation of the joint.

After the inner joint member 4 has been removed or withdrawn from the joint the ball 3 will then be in the position as shown in FIG. 3. The ball center 13 is now displaced from the rolling circle 14 and the ball 3 is moved radially inwardly toward the axis of rotation 15 of the joint. However, the ball 3 will be retained in this position and cannot drop into the interior of the outer joint 1 because the space $a$ between two adjacent extensions 10 of the control body 9 is less than the diameter $d$ of the ball 3. The balls 3 are substantially of a uniform diameter, however, in order to obtain proper clearance and improved operation of the joint it may be desirable to measure and select particularly dimensioned balls for particular pairs of opposed grooves.

In FIG. 4, the control body 9 with its extensions 10 between which the balls 3 are located when the joint is assembled can be clearly seen.

It is pointed out that although the present embodiment disclosed a single control body, the control body may comprise control means including a plurality of individual control elements each of which is provided with an extension 10 for ball retention.

It will therefore be apparent that the present invention has the advantage of significantly facilitating the assembly of the joint since after the cage has been fitted in the outer joint member, the control body can then be inserted and the balls will then be securely retained in the cage openings and in the grooves of the outer joint member. It is also possible to remove the splined shaft constituting the inner joint member or the joint on the opposite side of the vehicle if these parts are worn or require replacement for other reasons without the necessity of disassemblying the joint since the balls will not become disengaged from their operative positions with respect to the outer joint member after the inner joint member has been removed. As a result, the inner joint member together with a splined shaft may be readily reassembled at any time.

The present invention also facilitates the storing of assembled universal joints since dissimilar exterior components without these splined shafts occupy considerably less space. Accordingly, these exterior parts can now be stored separately. In addition, the outer joint member, the cage, the control body and the balls constitute a single unit which, once assembled, can be stored as a unit until it is to be assembled into a joint with a particular inner joint member. The storage of partially assembled joints occupies less space and subsequently requires less time for re-assembly than if the various components of the universal joint were stored separately.

It will be understood that this invention is susceptible to modification in order to adapt it to different usages and conditions, and accordingly, it is desired to comprehend such modifications within this invention as may fall within the scope of appended claims.

What is claimed is:

1. A constant velocity universal joint comprising an outer joint member having a bore therethrough and a plurality of grooves in the surface of said bore, an inner joint member within said bore and having a plurality of grooves in its outer surface corresponding in number to and opposed from said outer joint member grooves to define pairs of opposed grooves, a plurality of balls between said joint members with each ball being in a pair of opposed grooves, a cage between said joint members and having a plurality of openings therein to retain said balls in a plane which is perpendicular to the axis of the cage, said cage having a first spherical surface on its outer face and a second spherical surface on its inner face, the centers of said first and second cage spherical surfaces being equidistant on opposite sides of said ball plane, means on the inner face of said outer joint member coacting with said cage first spherical surface for guiding said cage with respect to said outer joint member, a single control body on said inner joint member and having convex spherical outer surface thereon coacting with said cage second spherical surface, a plurality of extensions on said control body and between said balls extending towards said cage first spherical surface and projecting beyond said ball plane, the distance between adjacent extensions being less than the diameter of each ball.

2. A constant velocity universal joint as claimed in claim 1 wherein said control body comprises a plurality of control elements each positioned between adjacent balls and an annular web interconnecting said control elements, said extensions each being on a said control element.

3. A constant velocity universal joint as claimed in claim 2 wherein said web has an axial split therein.

* * * * *